United States Patent
Tiramani et al.

(10) Patent No.: US 11,536,360 B2
(45) Date of Patent: Dec. 27, 2022

(54) INLINE GEARBOX WITH FAST CHANGE GEARING

(71) Applicant: Auto IP LLC, Las Vegas, NV (US)

(72) Inventors: Paolo Tiramani, Las Vegas, NV (US); Kyle Denman, North Las Vegas, NV (US)

(73) Assignee: Auto IP LLC, Las Vegas, NV (US)

( * ) Notice: Subject to any disclaimer, the term of this patent is extended or adjusted under 35 U.S.C. 154(b) by 0 days.

(21) Appl. No.: 17/847,866

(22) Filed: Jun. 23, 2022

(65) Prior Publication Data
US 2022/0316576 A1    Oct. 6, 2022

Related U.S. Application Data

(60) Division of application No. 16/670,688, filed on Oct. 31, 2019, now Pat. No. 11,391,360, which is a continuation-in-part of application No. 16/168,957, filed on Oct. 24, 2018, now Pat. No. 11,193,574.

(60) Provisional application No. 62/754,667, filed on Nov. 2, 2018, provisional application No. 62/735,966, filed on Sep. 25, 2018, provisional application No. 62/616,601, filed on Jan. 12, 2018, provisional application No. 62/577,965, filed on Oct. 27, 2017, provisional application No. 62/577,423, filed on Oct. 26, 2017.

(51) Int. Cl.
| | |
|---|---|
| *F16H 57/023* | (2012.01) |
| *F16H 3/091* | (2006.01) |
| *F16D 3/06* | (2006.01) |
| *F16H 57/02* | (2012.01) |

(52) U.S. Cl.
CPC ............ *F16H 57/023* (2013.01); *F16D 3/06* (2013.01); *F16H 3/091* (2013.01); *F16H 3/0915* (2013.01); *F16H 2057/0235* (2013.01); *F16H 2057/02043* (2013.01); *F16H 2200/00* (2013.01)

(58) Field of Classification Search
CPC ...... F16H 3/091; F16H 3/0915; F16H 57/023; F16H 2057/02043; F16H 2057/0235; F16H 2057/0335; F16H 2200/00; F16D 3/06
See application file for complete search history.

(56) References Cited

U.S. PATENT DOCUMENTS

| | | | | | |
|---|---|---|---|---|---|
| 3,187,209 | A | * | 6/1965 | Schmitter | F16H 57/031 74/411 |
| 3,645,153 | A | * | 2/1972 | Northcraft | F16H 57/037 475/198 |
| 4,170,152 | A | * | 10/1979 | Windish | F16H 3/663 74/606 R |
| 4,311,062 | A | * | 1/1982 | Hamada | F16H 3/0915 74/357 |

FOREIGN PATENT DOCUMENTS

| | | | | |
|---|---|---|---|---|
| DE | 4420305 C1 | * | 5/1995 | .......... F16H 57/023 |
| JP | 61233245 A | * | 10/1986 | |

* cited by examiner

Primary Examiner — Joseph Brown
(74) Attorney, Agent, or Firm — McCarter & English, LLP

(57) ABSTRACT

An inline gearbox for a land vehicle that includes an engine having a clutch housing for the transmission of rotational force from the engine to one or more wheels for propelling the land vehicle, wherein the inline gearbox includes a fast-change gear assembly.

7 Claims, 6 Drawing Sheets

INLINE GEARBOX WITH FAST CHANGE GEARING

CROSS-REFERENCES TO RELATED APPLICATIONS

This application is a divisional of U.S. patent application Ser. No. 16/670,688, filed on Oct. 31, 2019, which claims the benefit of U.S. Provisional Application No. 62/754,667, filed Nov. 2, 2018, and is a continuation-in-part application of U.S. patent application Ser. No. 16/168,957 (now U.S. Pat. No. 11,193,574), filed Oct. 24, 2018, which claims the benefit of U.S. Provisional Application No. 62/577,423, filed Oct. 26, 2017, U.S. Provisional Application No. 62/577,965, filed Oct. 27, 2017, U.S. Provisional Application No. 62/616,601, filed Jan. 12, 2018 and U.S. Provisional Application No. 62/735,966, filed Sep. 25, 2018.

BACKGROUND OF THE INVENTION

Field of the Invention

This invention relates to gearbox design.

Description of the Related Art

Gear systems are used in order to better match the torque, power and rotational speed characteristics of a rotating power source with the needs of the application. In the case of gearboxes used in connection with internal combustion engines for automotive applications, current designs generally are limited to use in relatively narrow performance bands, and do not lend themselves well to use in a wide variety of different types of vehicles. For example, a gearbox suitable for a high performance automobile intended for a paved racetrack may prove unsuitable if used in an off-road vehicle.

This drawback of current automotive gearbox design may be particularly experienced, for example, in the case of a base vehicle intended to be marketed for different applications, such as for street, track, off-road, etc. Current options may disadvantageously require the gearbox manufacturer to offer a number of gearbox/differential/transfer case units of different design, since a gearbox having appropriate power transmission characteristics for one application may not be appropriate for another desired application. Likewise, an automotive manufacturer may need to order and maintain a different gearbox for each of its offerings intended for a different target performance market.

This drawback also presents itself in the case of vehicles which may be modified or customized post-sale by automotive enthusiasts. For such vehicles, a decision to change the performance characteristics of the vehicle might necessitate purchase and installation of a different gearbox design, at substantial time and expense.

SUMMARY OF THE INVENTION

The present invention provides a gearbox design that can be used for a wide variety of applications that heretofore could require different gearboxes, particularly for land vehicles utilizing an engine, such as an internal combustion engine, for propulsion.

The gearbox of the present invention is suited for use in vehicles which may be modified or customized post-sale, such as those disclosed in U.S. Patent Publication No. 2015/0210319 A1.

In a first aspect, the present invention is directed to an inline gearbox for a land vehicle that includes an engine having a clutch housing for the transmission of rotational force from the engine to one or more wheels for propelling the land vehicle, wherein the inline gearbox comprises a gearbox housing having a front end, a side and a rear end, with the front end adapted to be joined to the clutch housing. There is provided an input shaft having an axis and contained at least in part within the gearbox housing proximate to the front end of the gearbox housing, with the input shaft adapted to receive rotational force from the engine through the clutch housing, and a primary gear train contained within the gearbox housing comprising (a) a lay shaft having an axis generally parallel to the axis of the input shaft and rotationally coupled to the input shaft to receive rotational force from the input shaft, the axes of the input shaft and the lay shaft being spaced-apart to define a forward plane; (b) a drive shaft; and (c) a plurality of selectively engaged meshed gear pairs respectively mounted on the lay shaft and the drive shaft for transmitting rotational force from the lay shaft to the drive shaft. The inline gearbox also includes an output shaft having an axis generally parallel to the axis of the lay shaft and contained at least in part within the gearbox housing proximate to the rear end of the gearbox housing, with the output shaft rotationally coupled to the drive shaft to receive rotational force from the drive shaft and for transmitting rotational force to the one or more wheels, the axes of the output shaft and the lay shaft being space-apart to define a rear plane.

In this first aspect of the present invention, the inline gearbox features a fast-change gear assembly contained within the gearbox housing, the fast-change gear assembly being positioned proximate the front end of the gearbox housing and interposed between the input shaft and the lay shaft, with the fast-change gear assembly comprising a first fast-change gear and a second fast-change gear meshing with the first fast-change gear, and with the first fast-change gear and the second fast-change gear each having an axis generally parallel to the axis of the input shaft. The first fast-change gear is rotationally coupled to the input shaft so as to rotate with the rotation of the input shaft, and translationally uncoupled to the input shaft to permit removal of the first fast-change gear from the gearbox housing; and the second fast-change gear is rotationally coupled to the lay shaft so as to rotate the lay shaft upon rotation of the second fast-change gear, and translationally uncoupled to the lay shaft to permit removal of the second fast-change gear from the gearbox housing.

In a second aspect of this invention, the inline gearbox utilizes the gearbox housing, input shaft, primary gear train and output shaft arrangement of the first aspect of the invention, but with a different fast-change gear arrangement. More specifically, the second aspect of the invention features a fast-change gear assembly positioned proximate the front end of the gearbox housing and interposed between the input shaft and the lay shaft, and located to one side of a forward plane defined by the axes of the input shaft and the lay shaft. The fast-change gear assembly comprises a first fast-change gear and a second fast-change gear meshing with the first fast-change gear, the first fast-change gear and the second fast-change gear having respective first and second fast-change gear axes that are both approximately perpendicularly oriented to a direction on the forward plane approximately perpendicular to the axis of the input shaft. The first fast-change gear is rotationally coupled to the input shaft so as to rotate with the rotation of the input shaft and is removable. The second fast-change gear is rotationally coupled to the lay shaft so as to rotate the lay shaft upon rotation of the second fast-change gear, and is removable.

In a third aspect, the present invention is directed to an inline gearbox for a land vehicle that includes an engine having a clutch housing for the transmission of rotational force from the engine to one or more wheels for propelling the land vehicle, wherein the inline gearbox comprises a gearbox housing having a front end, a side and a rear end, with the front end adapted to be joined to the clutch housing. There is provided an input shaft having an axis and contained at least in part within the gearbox housing proximate to the front end of the gearbox housing, with the input shaft adapted to receive rotational force from the engine through the clutch housing, and a primary gear train contained within the gearbox housing comprising (a) a lay shaft having an axis generally parallel to the axis of the input shaft, the axes of the input shaft and the lay shaft being spaced-apart to define a forward plane; (b) a drive shaft rotationally coupled to the input shaft to receive rotational force from the input shaft; and (c) a plurality of selectively engaged meshed gear pairs respectively mounted on the lay shaft and the drive shaft for transmitting rotational force from the drive shaft to the lay shaft. The inline gearbox also includes an output shaft having an axis generally parallel to the axis of the lay shaft and contained at least in part within the gearbox housing proximate to the rear end of the gearbox housing, with the output shaft rotationally coupled to the lay shaft to receive rotational force from the lay shaft and for transmitting rotational force to the one or more wheels, the axes of the output shaft and the lay shaft being space-apart to define a rear plane.

In this third aspect of the subject invention, the inline gearbox features a fast-change gear assembly contained within the gearbox housing, positioned proximate the rear end of the gearbox housing and interposed between the output shaft and the lay shaft. The fast-change gear assembly comprises a first fast-change gear and a second fast-change gear meshing with the first fast-change gear, the first fast-change gear and the second fast-change gear each having an axis generally parallel to the axis of the output shaft. The first fast-change gear is rotationally coupled to the lay shaft so as to rotate with the rotation of the lay shaft, and translationally uncoupled to the lay shaft to permit removal of the first fast-change gear from the gearbox housing. The second fast-change gear is rotationally coupled to the output shaft so as to rotate the output shaft upon rotation of the second fast-change gear, and translationally uncoupled to the output shaft to permit removal of the second fast-change gear from the gearbox housing.

In a fourth aspect of this invention, the inline gearbox utilizes the gearbox housing, input shaft, primary gear train and output shaft arrangement of the third aspect of the invention, but with a different fast-change gear arrangement. More specifically, the fourth aspect of the invention features a fast-change gear assembly positioned proximate the rear end of the gearbox housing and interposed between the output shaft and the lay shaft, and located to one side of the rear plane defined by the axes of the output shaft and the lay shaft. The fast-change gear assembly comprises a first fast-change gear and a second fast-change gear meshing with the first fast-change gear, the first fast-change gear and the second fast-change gear having respective first and second fast-change gear axes that are both approximately perpendicularly oriented to a direction on the rear plane approximately perpendicular to the axis of the output shaft. The first fast-change gear is rotationally coupled to the lay shaft so as to rotate with the rotation of the lay shaft and is removable. The second fast-change gear is rotationally coupled to the output shaft so as to rotate the output shaft upon rotation of the second fast-change gear, and is removable.

These and other aspects of the present invention are described in the drawings annexed hereto, and in the description of the preferred embodiments and claims set forth below.

DETAILED DESCRIPTION OF THE PREFERRED EMBODIMENTS

Overall Gearbox Description

Figure 1A:
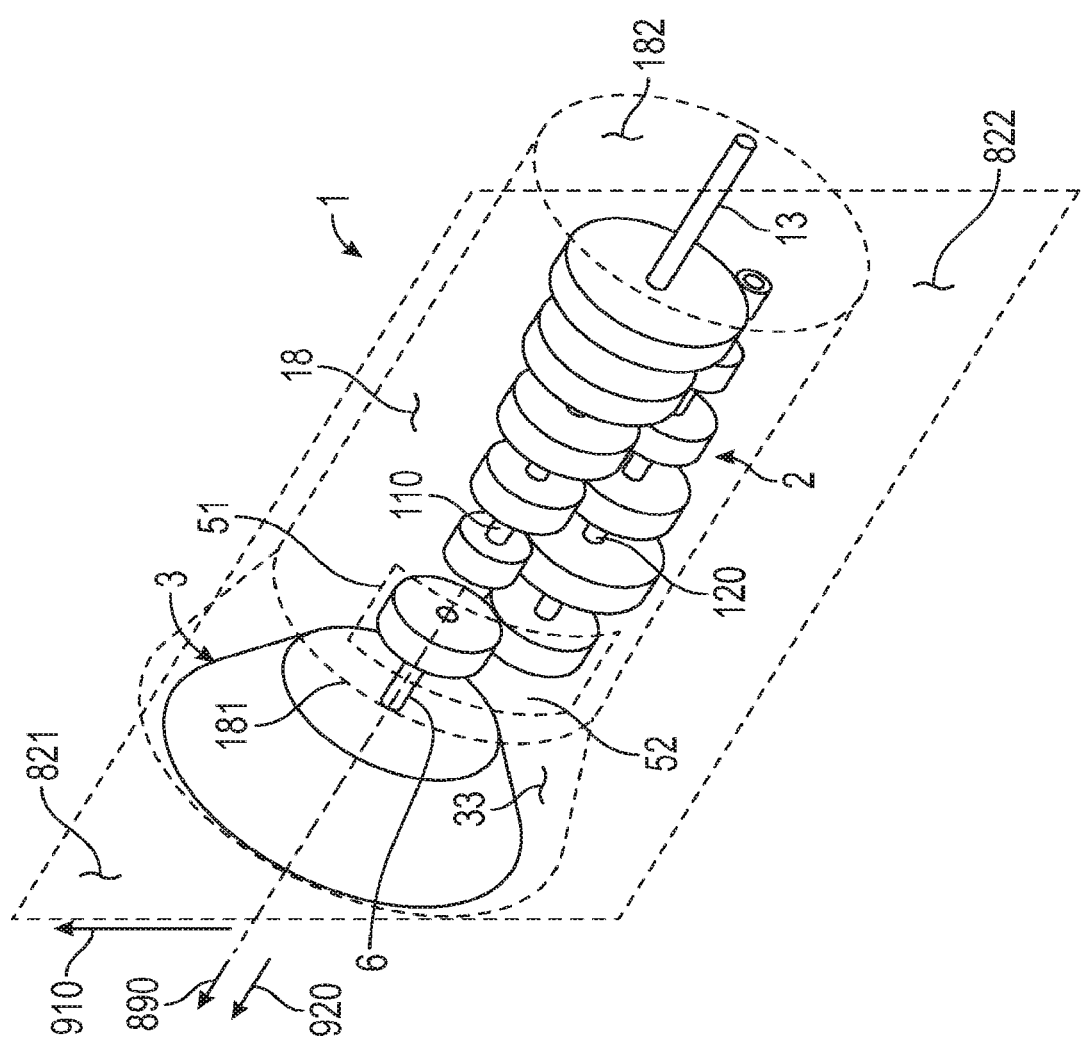
FIG. 1A is a schematic perspective view depicting certain principal components of the present invention, as well as certain geometrical aspects of the present invention, utilizing the first embodiment of the present invention for illustrative purposes.

Referring to FIG. 1A, there is shown an inline gearbox 1 that includes a primary gear train 2. Through the intermediary of a clutch assembly or clutch 3, an engine rotates an input shaft 6 of gearbox 1. Input shaft 6 in turn rotationally energizes primary gear train 2 (described further below), which in turn rotates output shaft 13.

In a typical application, the input shaft 6 of inline gearbox 1 is coupled to a reciprocating piston internal combustion engine and is employed to propel a motor vehicle. In such an application, the output shaft 13 will rotate one or more wheels, usually by way of rotating a drive shaft linked to differential gearing housed distally separate from inline gearbox 1 (such differential gearing and its housing often referred to simply as a "differential"), which distributes the received rotational force to wheels located on opposite sides of the vehicle. Exemplary engines for such an application include spark-ignition liquid fueled (e.g., gasoline) V-8 engines.

The term "primary gear train" in this disclosure denotes the gearing assembly through which the torque and rotation imparted by the engine are transmitted, and includes means for selectively activating one of plural gear pairs of varying diameters during engine operation in order to change the angular speed/torque characteristics that are output from the primary gear train, in order to match the application requirements as they vary during driver use, such as, in the case of a motor vehicle journey, initial movement from standing, acceleration/passing, low speed and high speed movement at uniform speed, and the like. The primary gear train does not include differential gearing of the type referenced above, which is typically utilized to provide or respond to different wheel rotational speeds encountered in vehicle turns, or different levels of tractions between wheels.

Figure 1B:
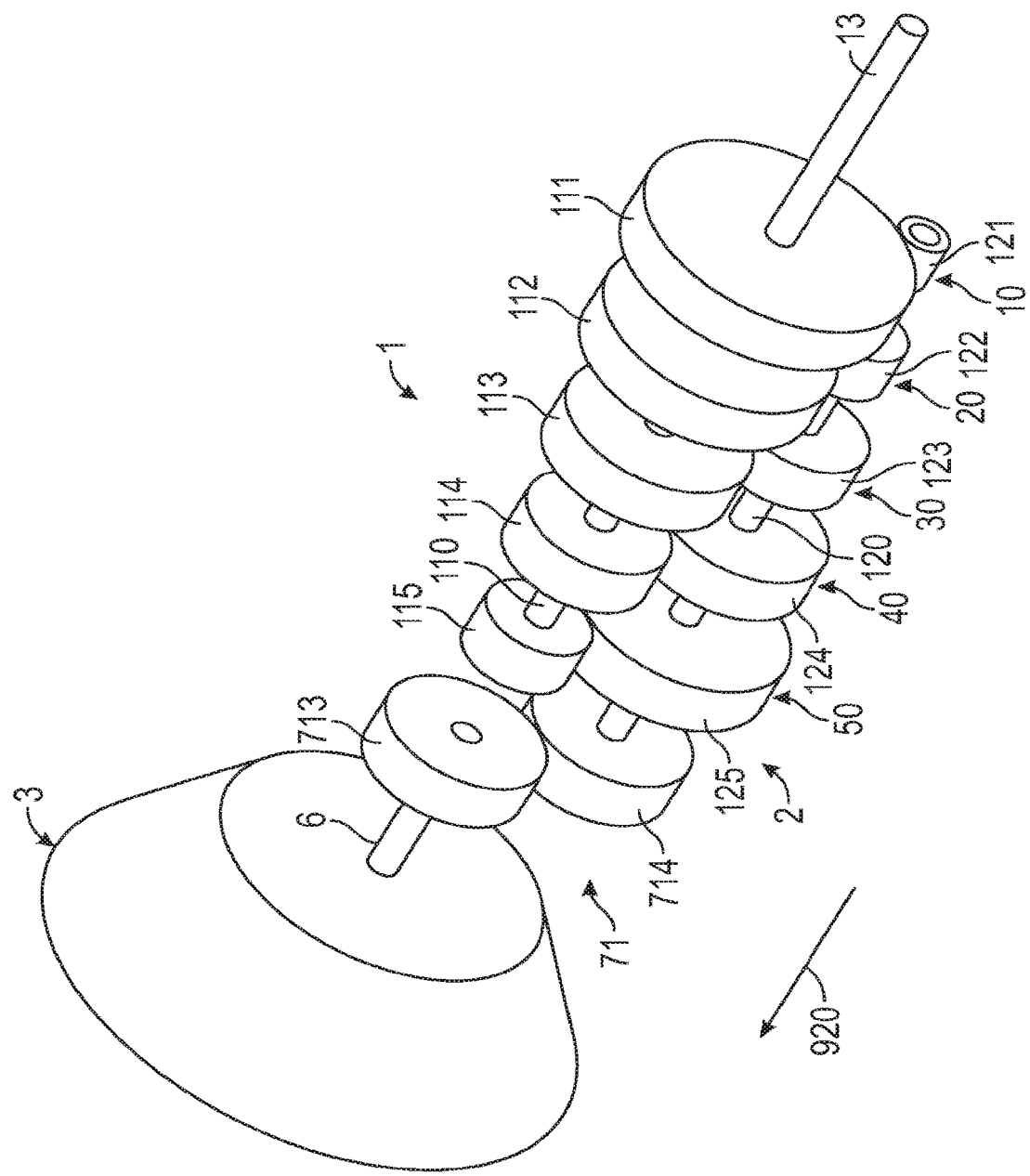
FIG. 1B is a schematic perspective view of the first embodiment of the present invention, identifying particular gear and shaft components also present in FIG. 1A.

Throughout this disclosure, like designations in the embodiments denote the same components. The overall gearbox description of inline gearbox 1 and its gearbox components described herein with reference to FIGS. 1A and 1B is applicable to all four embodiments of the present invention described below (and illustrated in FIGS. 1A-4B).

The term "inline gearbox" in this disclosure denotes a class of gearboxes in which the axes of the principal rotating shafts in the primary gear train, in the present disclosure the axes of drive shaft 110 and lay shaft 120 of primary gear train 2, are approximately parallel to the axis of the input shaft 6 from the engine and clutch 3 (and correspondingly parallel to each other). In turn, input shaft 6 would be approximately parallel to the centerline of the engine crankshaft.

The axial centerline (axis) of input shaft 6 of gearbox 1 in FIG. 1A is indicated as 890. The orientation of gearbox 1 as depicted in FIG. 1A (and in FIGS. 1B-4A as well) is arbitrarily denominated the upright orientation, and arrow 910 points in an upward or vertical direction. In the figures, arrow 920 is longitudinally oriented and is arbitrarily deemed to point in the forward direction; thus in FIG. 1A (and in the other figures as well), the rotational force from the engine crankshaft available at the rear or rearward end of the engine would be coupled to the forward end of the clutch 3 (the widest end of clutch 3 in the figures).

As indicated above, primary gear train 2 comprises a drive shaft 110 and a lay shaft 120. As shown in FIG. 1A, the axes of input shaft 6 and lay shaft 120 are spaced-apart and parallel with each other to define a longitudinally oriented forward plane 821, and the axes of output shaft 13 and lay shaft 120 are spaced-apart and parallel with each other to define a longitudinally oriented rear plane 822. While planes 821 and 822 are depicted only in FIG. 1A for purposes of clarity, they are referred to at times in regard to embodiments of the present invention depicted in the other figures (other than FIG. 1A). Accordingly, planes 821 and 822 should be considered present in those other figures to the same extent as is shown in FIG. 1A. In the embodiment shown in FIG. 1A, planes 821 and 822 are coplanar (but they need not be), and vertically-oriented (but they need not be). Arrows 910 and 920 in FIG. 1A lie in a plane that is coplanar with forward plane 821. In this disclosure, a component is deemed to be positioned on the "side" or to one "side" of gearbox 1 or gearbox housing 18 if it is positioned for the most part to one side of plane 821 or plane 822, as specified.

Gearbox Components

Primary gear train 2 of gearbox 1 is contained within a gearbox housing 18 having a forward or front end 181 proximate to clutch 3 and a rearward or rear end 182 distal from clutch 3. Housing 18, front end 181 and rear end 182 are shown in outline (dashed lines) in FIGS. 1A and 3, and are omitted from the balance of the figures for purposes of simplifying the drawings. Nonetheless, gearbox housing 18, front end 181 and rear end 182 should be considered part of every embodiment and figure in this disclosure as if expressly illustrated therein.

Figure 3:
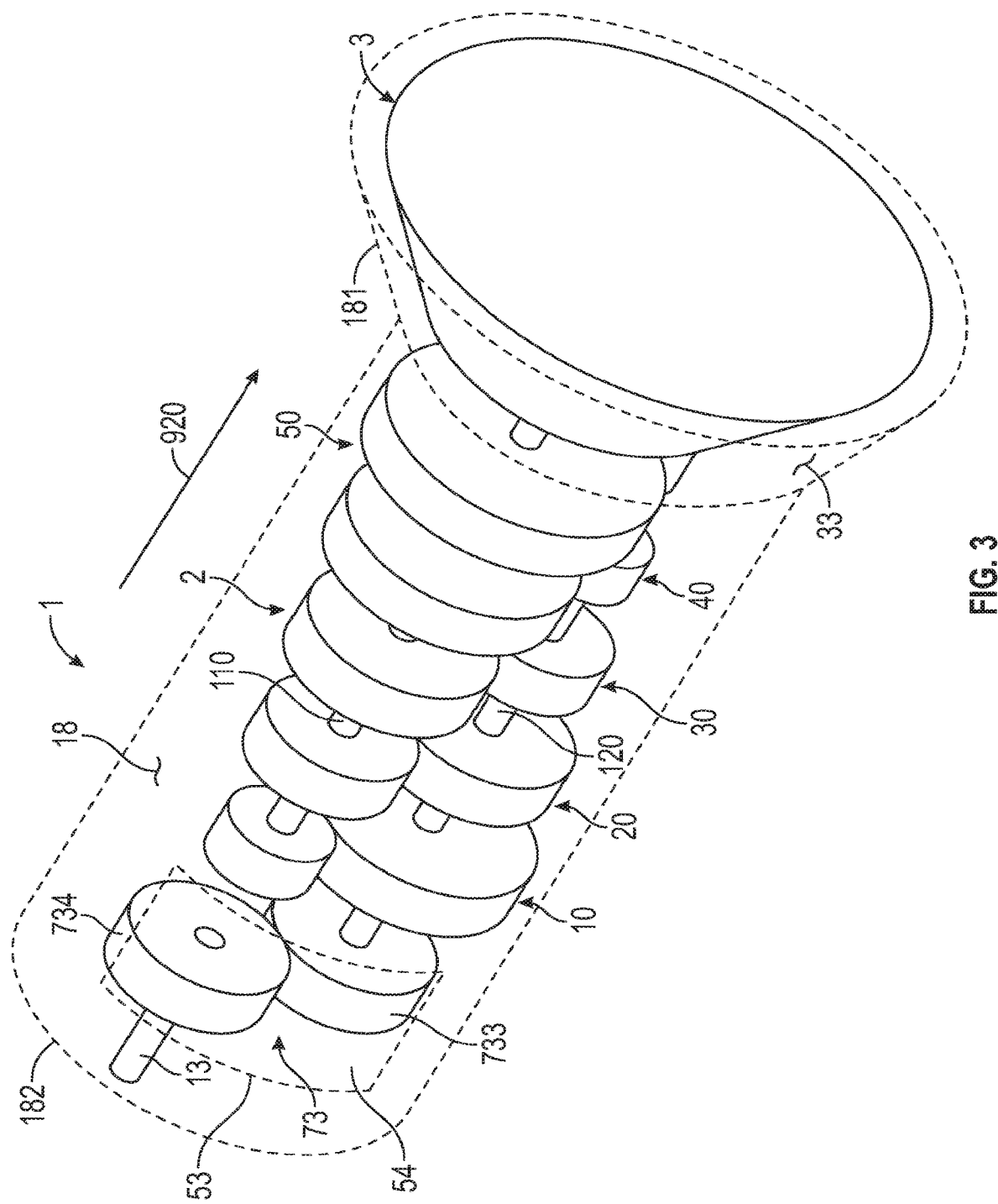
FIG. 3 is a schematic perspective view of the third embodiment of the present invention.

The operative portions of clutch 3 are contained within a clutch housing 33, which is shown in outline (dashed lines) in FIGS. 1A and 3, and which is omitted from the balance of the figures for purposes of simplifying the drawings. Nonetheless, clutch housing 33 should be considered part of every embodiment and figure in this disclosure as if expressly illustrated therein. In this disclosure, it is assumed that the forward or front end of clutch housing 33 is secured to the rearward or rear end of the engine utilizing for example bolts.

Typically gearbox housing 18 is also secured to clutch housing 33 with bolts, and the two assemblies can be separated for maintenance, service and the like. To facilitate ease of separation, the forward end of input shaft 6 extending forward of front end 181 can have longitudinal splines formed parallel to the axis of input shaft 6 which mate with a splined aperture at the rear of clutch 3. Thus clutch 3 and input shaft 6 are rotationally coupled—rotation of clutch 3 will rotate input shaft 6; while clutch 3 and input shaft 6 are translationally uncoupled—gearbox 1 can be separated from clutch 3 by unbolting gearbox 1 from clutch 3, and displacing gearbox 3 in the rearward direction.

The input shaft 6 of gearbox 1 passes into gearbox housing 18 at front end 181 to rotate primary gear train 2, and primary gear train 2 rotates output shaft 13, which passes out of gearbox housing 18 at rear end 182. Primary gear train 2 of gearbox 1 comprises five meshing gear pairs on drive shaft 110 and lay shaft 120, which correspond to the forward gears of a motor vehicle in which gearbox 1 is utilized. These five meshing gear pairs are 1st gear pair 10, 2nd gear pair 20, 3rd gear pair 30, 4th gear pair 40 and 5th gear pair 50, shown in FIG. 1B and elsewhere.

Gear pairs 10-50 are selectively engaged for transmitting torque to and rotating output shaft 13. As an example of means for so selectively engaging gear pairs 10-50, gears 121, 122, 123, 124, and 125 of gear pairs 10, 20, 30, 40 and 50 respectively, shown in FIGS. 1A-1B and also in FIGS. 2-4B, are considered to be axially and angularly secured at fixed positions along lay shaft 120; thus gears 121, 122, 123, 124 and 125 cannot be shifted laterally (in the longitudinal direction, parallel to axis 890) along lay shaft 120, and gears 121, 122, 123, 124 and 125 must rotate with the rotation of lay shaft 120. In comparison, gears 111, 112, 113, 114 and 115 of gear pairs 10, 20, 30, 40 and 50 are considered to be axially secured at fixed positions along the length of drive shaft 110 (and thus cannot be shifted laterally along the shaft), but are mounted to freewheel on drive shaft 110 (i.e., rotationally uncoupled to drive shaft 110).

In this example of means for selectively engaging gear pairs 10-50, there is additionally considered to be gear shift clutches (omitted for purposes of clarity) proximate to each of gears 111, 112, 113, 114 and 115. Each gear shift clutch includes an annular ring mounted on drive shaft 110 that maintains angular correspondence and rotates with drive shaft 110 (for example by means of splines), but which is free to be shifted laterally (in the longitudinal direction, parallel to axis 890) along drive shaft 110. Each gear shift clutch further includes a fork that shifts the annular ring laterally on drive shaft 110, either upon manual actuation by a driver or automatic actuation by an automatic shifting mechanism. When a gear shift clutch is shifted laterally on drive shaft 110, it engages/disengages one or more of gears 111, 112, 113, 114 and 115. When such a gear is engaged, the gear is rotationally coupled to drive shaft 110, thereby to change the ratio of the rotational speed of the input shaft 6 and the output shaft 13 in accordance with the gear diameters of the engaged gear pair. (In the figures of this disclosure, the diameters of the gear pairs are representative only and are not intended to be indicative of specific gearing ratios). Further specifics as to the structure and operation of gear shift clutches can be found at ¶¶ 34-39 of U.S. Provisional Patent Application Nos. 62/577,423, filed Oct. 26, 2017 and 62/577,965, filed Oct. 27, 2017; the contents of those paragraphs (and the figures to which those paragraphs refer, including FIGS. 3A-3E and 2A) are hereby incorporated by reference as if fully set forth herein. Those further specifics also can be found at ¶¶ 35-40 of U.S. patent application Ser. No. 16/168,957, filed Oct. 24, 2018 and published May 2, 2019 as U.S. Patent Publication No. US 2019/0128381 A1; the contents of those paragraphs (and the figures to which those paragraphs refer, including FIGS. 3A-3E and 2A) likewise are hereby incorporated by reference as if fully set forth herein.

Although five forward gears are shown, the teachings of this invention are not dependent on the number of forward gears contained within inline gearbox 1, and can be used in a gearbox containing other numbers of forward gears. Further, there can also be provided a reverse gear assembly, in order to reverse the direction of rotation (not shown).

Embodiment 1

The first embodiment of the present invention, which is shown in FIGS. 1A and 1B, features a fast-change ("FC") gear assembly 71 contained within gearbox housing 18, positioned proximate the front end 181 of gearbox housing 18, interposed between input shaft 6 and lay shaft 120, and mounted on those shafts. Referring to FIG. 1B, input shaft 6 transfers the engine torque to FC gear assembly 71, and then to lay shaft 120 of primary gear train 2. Lay shaft 120 in turn rotates drive shaft 110 of gear train 2 via selective engagement of one of gear pairs 10-50, as discussed above. Drive shaft 110 rotates output shaft 13 to rotate the wheels. In the first embodiment shown in FIGS. 1A and 1B, output shaft 13 is the rear portion of drive shaft 110.

FC gear assembly 71 in the first embodiment comprises a first FC gear 713 mounted on the rearward end of input shaft 6 (i.e., the portion of input shaft 6 furthest from the orientation designated by the head of arrow 920), and a second FC gear 714 mounted on the forward end of lay shaft 120 (i.e., the portion of input shaft 6 closest to the orientation designated by the head of arrow 920). First FC gear 713 meshes with second FC gear 714. First and second FC gears 713 and 714 can be spur or helical in design, in accordance with preference subject to other design constraints. The axes of first and second FC gears 713 and 714 each are longitudinally oriented and lie in forward plane 821. The axis of first FC gear 713 is co-linear with the axis (axis 890) of input shaft 6, and the axis of second FC gear 714 is co-linear with the axis of lay shaft 110.

First FC gear 713 is rotationally coupled to input shaft 6, such as by means of interior splines formed in first FC gear 713 which mate with exterior splines formed on the rearward end of input shaft 6; these splines are longitudinally oriented parallel with the axes of first FC gear 713 and input shaft 6. Likewise, second FC gear 714 is rotationally coupled to lay shaft 120, such by means of interior splines formed in second FC gear 714 which mate with exterior splines formed on the forward end of lay shaft 120; these splines are longitudinally oriented parallel with the axes of second FC gear 714 and lay shaft 120. Thus upon rotation of input shaft 6, first FC gear 713 will rotate, which will rotate second FC gear 714 and lay shaft 120. The rotational speed at which second FC gear 714 rotates will be the same as the speed at which first FC gear 713 rotates only in the case where they have the same diameter. In the case where they are of different diameters, their rotational speed will differ in direct proportion to the ratio of their diameters.

First FC gear 713 preferably is translationally uncoupled to input shaft 6 to permit its removal. Thus first FC gear 713 is not permanently fastened to input shaft 6, but rather is preferably able to be longitudinally moved in a direction parallel to the axis (axis 890) of input shaft 6, such as by being slid along longitudinal splines of input shaft 6, for removal and replacement. Likewise, second FC gear 74 preferably is translationally uncoupled and not permanently fastened to lay shaft 120, but rather is preferably able to be longitudinally moved in a direction parallel to the axis of lay shaft 120, such as by being slid along longitudinal splines of lay shaft 120, for removal and replacement.

First and second FC gears 713 and 714 in the first embodiment can be accessed, removed and changed in a variety of ways without the need to disassemble primary gear train 2, in accordance with the specific design. First and second FC gears 713 and 714 are accessible for example by separating gearbox housing 18 from clutch housing 33, without the need to disassemble primary gear train 2. Alternatively, as shown in FIG. 1A, an access port 51 having a removable cover 52 can be provided at a suitable location on the side of gearbox housing 18 proximate to front end 181 and to first and second FC gears 713 and 714, which obviates the need for separating gearbox housing 18 from clutch housing 33 in order to gain access to first and second FC gears 713 and 714. Access port 51 can also be positioned on the bottom of gearbox housing 18, or on the top of gearbox housing 18, or at any other location about the perimeter of gearbox housing 18 from which first and second FC gears 713 and 714 are reasonably accessible. Access port 51 renders first and second FC gears 713 and 714 accessible for removal and replacement without the need for separating gearbox housing 18 from clutch housing 33.

As a particular example of the benefits of the first embodiment of the subject invention, a different rotational speed/torque relationship may be desired when using inline gearbox 1 for a race track application instead of an off-road application. In such a case, first and second FC gears 713 and 714 can be swapped out for gears of different diameters, which changes the rotational speed of output shaft 13 for a given rotational speed of input shaft 6. In general, the gearbox input shaft/output shaft speed ratio can be changed by utilizing first and second FC gears 713 and 714 of varying diameters without changing any gears of the primary gear train 2.

Embodiment 2

Figure 2:
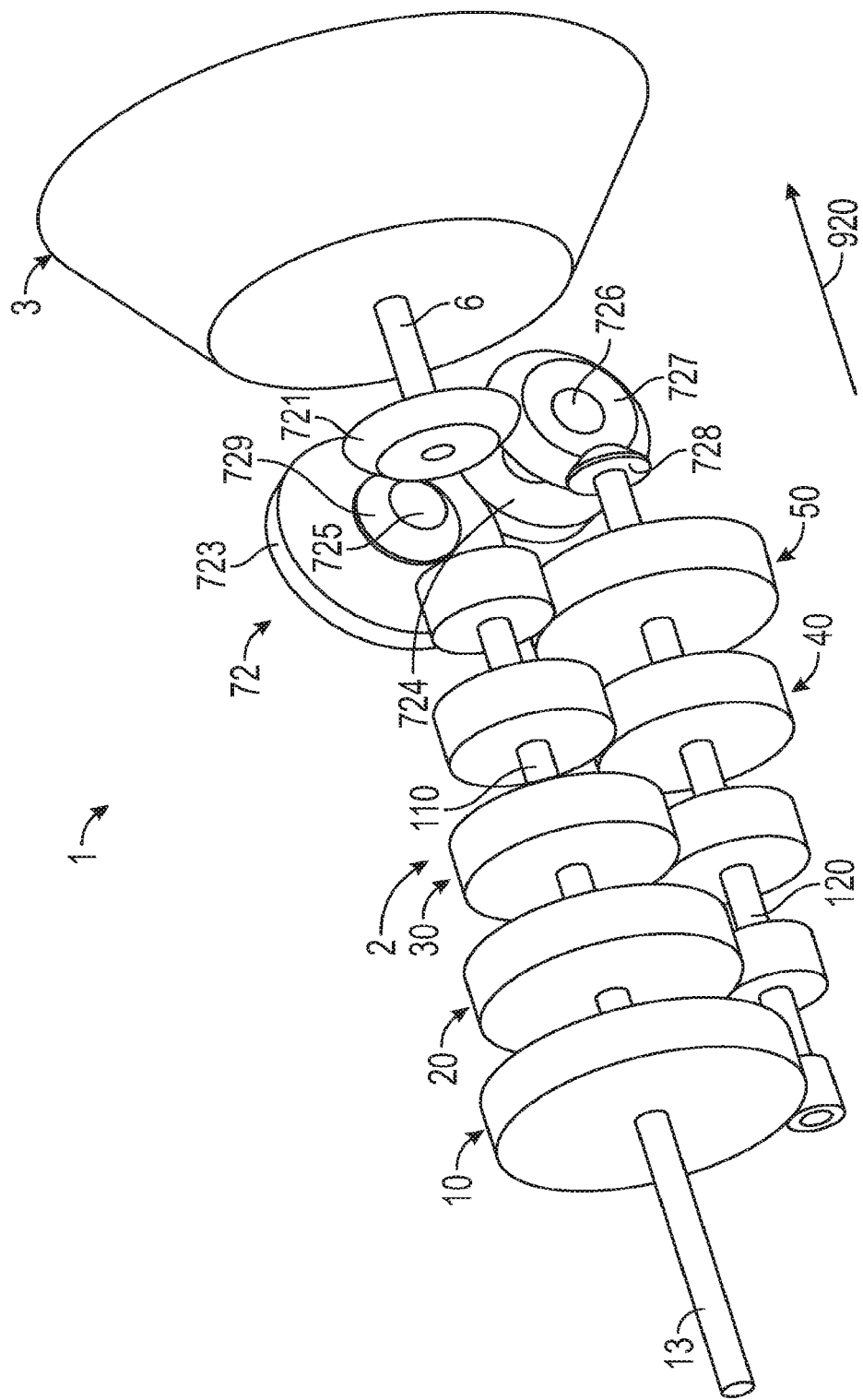
FIG. 2 is a schematic perspective view of the second embodiment of the present invention.

The second embodiment of the present invention, which is shown in FIG. 2, features a FC gear assembly 72 positioned to one side of forward vertical plane 821 of gearbox housing 18 proximate its front end 181, interposed between input shaft 6 and lay shaft 120, and mounted on shafts different from input shaft 6 and lay shaft 120. Referring to FIG. 2, input shaft 6 transfers the engine torque to FC gear assembly 72, and then to lay shaft 120 of primary gear train 2. Lay shaft 120 in turn rotates drive shaft 110 of gear train 2 via selective engagement of one of gear pairs 10-50, as discussed above. Drive shaft 110 rotates output shaft 13 to rotate the wheels. In the embodiment of FIG. 2, output shaft 13 is the rear portion of drive shaft 110.

FC gear assembly 72 in the second embodiment comprises a first FC gear 723 mounted on first FC gear shaft 725, and a second FC gear 724 mounted on second FC gear shaft 726. First FC gear 723 meshes with second FC gear 724. First and second FC gears 723 and 724 can be spur or helical in design, in accordance with preference subject to other design constraints. In a first variant of the second embodiment of the present invention, shown in FIG. 2, the axes of FC gear shafts 725 and 726 each are orthogonal to longitudinally oriented forward plane 821 (plane 821 being shown in FIG. 1A) in any two mutually perpendicular directions on forward plane 821, such that the axis of first FC gear shaft 725 is perpendicular to the axis of input shaft 6, and the axis of second FC gear shaft 726 is perpendicular to the axis of lay shaft 120.

In a second variant of the second embodiment of the present invention, the axes of first and second FC gear shafts 725 and 726 can be transversely oriented to the direction on forward plane 821 (plane 821 being shown in FIG. 1A) that is approximately parallel to the axis of input shaft 6 and/or the axis of lay shaft 120 (which axes are parallel to each other, as described above). In this disclosure, the axes of FC gear shafts 725 and 726 are "transversely oriented" to forward plane 821 as just described when they are oriented at a FC gear shaft angle $\alpha$ between zero and 90 degrees ($90°>\alpha>0°$) relative to the axes of input shaft 6/lay shaft 120, such as in the range of from 35 degrees to 75 degrees ($75°\geq\alpha\geq35°$), or more particularly in the range of from 45 degrees to 60 degrees ($60°\geq\alpha\geq45°$); for example, approximately 45 degrees ($\alpha\approx45°$) or approximately 60 degrees ($\alpha\approx60°$). Preferably, those axes of first and second FC gear shafts 725 and 726 at the same time are maintained at a right angle (or nearly so) to the direction on forward plane 821 which is perpendicular to the axes of input shaft 6/lay shaft 120. For any acute FC gear shaft angle, the FC gear shaft angle $\alpha$, when considered with the lengths of gear shafts 725 and 726, should be sufficient to avoid first FC gear 723 and second FC gear 724 interfering with either drive shaft 110 or lay shaft 120.

As shown in FIG. 2, a bevel gear 721 mounted on input shaft 6 meshes with a bevel gear 729 mounted on first FC gear shaft 725, and a bevel gear 728 mounted on lay shaft 120 meshes with a bevel gear 727 mounted on second FC gear shaft 726. Bevel gears 721 and 729 can be spur or helical in design, in accordance with preference subject to other design constraints, and bevel gears 727 and 728 can be spur or helical in design, in accordance with preference subject to other design constraints. Upon rotation of input shaft 6, bevel gear 721 will rotate, which will rotate bevel gear 729 and first FC gear 723. The rotation of first FC gear 723 will rotate second FC gear 724, which will rotate bevel gear 727. In turn, the rotation of bevel gear 727 will rotate bevel gear 728 and lay shaft 120. The rotational speed at which second FC gear 724 rotates will be the same as the speed at which first FC gear 723 rotates only in the case where they have the same diameter. In the case where they are of different diameters, their rotational speed will differ in direct proportion to the ratio of their diameters.

First FC gear 723 preferably is not permanently fastened within gearbox 1, but rather is secured in a manner to be removable from gearbox 1. For example, first FC gear 723 can be formed with interior splines that mate with exterior splines formed on first FC gear shaft 725; these splines preferably are longitudinally oriented parallel with the axes of gear 723 and first FC gear shaft 725. Thus first FC gear 723 is able to be moved along the longitudinal splines of FC gear shaft 725 for removal and replacement. Alternatively, first FC gear 723 and first FC gear shaft 725 can be removable together as an integrated unit. As yet another alternative, first FC gear 723, first FC gear shaft 725 and bevel gear 729 can be removable together as an integrated unit.

Likewise, second FC gear 724 preferably is not permanently fastened within gearbox 1, but rather is secured in a manner to be removable from gearbox 1, for example by being secured to be moveable along the axis of second FC gear shaft 726, employing splines, or by being removable with second FC gear shaft 726, or by being removable with both second FC gear shaft 726 and bevel gear 727, in a manner comparable to that just described.

First and second FC gears 723 and 724 in the second embodiment can be accessed, removed and changed in a variety of ways without the need to disassemble primary gear train 2, in accordance with the specific design. First and second FC gears 723 and 724 can be located either within gearbox housing 18 or outside gearbox housing 18. If located within gearbox housing 18, first and second FC gears 723 and 724 are accessible for example by separating gearbox housing 18 from clutch housing 33, without the need to disassemble primary gear train 2. Alternatively, an access port having a removable cover can be provided on the side of gearbox housing 18 proximate to front end 181 and to first and second FC gears 723 and 724, which obviates the need for separating gearbox housing 18 from clutch housing 33. If located outside gearbox housing 18, first and second FC gears 723 and 724 can be located within an FC gear housing having a removable cover, which is positioned on the side of gearbox housing 18 proximate front end 181. The FC gear housing design and associated components disclosed in U.S. patent application Ser. No. 16/168,957, filed Oct. 24, 2018 and published May 2, 2019 as U.S. Patent Publication No. US 2019/0128381 A1, is pertinent in this regard. The contents of that patent application disclosing the design specifics of that FC gear housing and cover, and the FC gear design and retention means therein, particularly the description found at ¶¶ 0041-0048 and shown in FIGS. 2A and 2B of that patent application, are incorporated by reference as if fully set forth herein.

Each of the access port/removable cover and separate housing just described can also be positioned on the bottom of gearbox housing 18, or on the top of gearbox housing 18, or at any other location about the perimeter of gearbox housing 18 from which first and second FC gears 723 and 724 are reasonably accessible, consistent with the orientation of forward plane 821.

As a particular example of the benefits of the second embodiment of the subject invention, a different rotational speed/torque relationship may be desired when using inline gearbox 1 for a race track application instead of an off-road application. In such a case, first and second FC gears 723 and 724 can be swapped out for gears of different diameters, which changes the rotational speed of output shaft 13 for a given rotational speed of input shaft 6. In general, the gearbox input shaft/output shaft speed ratio can be changed by utilizing first and second FC gears 723 and 724 of varying diameters without changing any of the gears of primary gear train 2.

Embodiment 3

The third embodiment of the present invention, which is shown in FIG. 3, features a FC gear assembly 73, positioned proximate the rear end 182 of gearbox housing 18, interposed between output shaft 13 and lay shaft 120, and mounted on those shafts. Referring to FIG. 3, input shaft 6 transfers the engine torque to rotate drive shaft 110 of primary gear train 2. Drive shaft 110 in turn rotates lay shaft 120 of gear train 2 via selective engagement of one of gear pairs 10-50, as discussed above. Lay shaft 120 rotates FC gear assembly 73, which rotates output shaft 13 to rotate the wheels. In the third embodiment shown in FIG. 3, output shaft 13 is not joined to drive shaft 110 (although it can be co-linear).

FC gear assembly 73 in the third embodiment comprises a first FC gear 733 mounted on the rearward end of lay shaft 120, and a second FC gear 734 mounted on the forward end of output shaft 13. First FC gear 733 meshes with second FC gear 734. First and second FC gears 733 and 734 can be spur or helical in design, in accordance with preference subject to other design constraints. The axes of first and second FC gears 733 and 734 each are longitudinally oriented, and lie in rear plane 822. The axis of first FC gear 733 is co-linear with the axis of lay shaft 120, and the axis of second FC gear 734 is co-linear with the axis of output shaft 13. In the embodiment of FIG. 3, output shaft 13 is joined to second FC gear 734 and is rotated by that second FC gear 734.

First FC gear 733 is rotationally coupled to lay shaft 120, such as by means of interior splines formed in first FC gear 733 which mate with exterior splines formed on the rearward end of lay shaft 120; these splines are longitudinally oriented parallel with the axes of first FC gear 733 and lay shaft 120. Likewise, second FC gear 734 is rotationally coupled to the forward end of output shaft 13, such as by means of interior splines formed in second FC gear 734 which mate with exterior splines formed on the forward end of output shaft 13; these splines are longitudinally oriented parallel with the axes of second FC gear 734 and output shaft 13. Thus upon rotation of lay shaft 120, first FC gear 733 will rotate, which will rotate second FC gear 734 and output shaft 13. The rotational speed at which second FC gear 734 rotates will be the same as the speed at which first FC gear 733 rotates only in the case where they have the same diameter. In the case where they are of different diameters, their rotational speed will differ in direct proportion to the ratio of their diameters.

First FC gear 733 preferably is translationally uncoupled to lay shaft 120 to permit its removal. Thus first FC gear 733 is not permanently fastened to lay shaft 120, but rather is preferably able to be longitudinally moved in a direction parallel to the axis of lay shaft 120, such as by being slid along longitudinal splines of lay shaft 120, for removal and replacement. Likewise, second FC gear 734 preferably is translationally uncoupled and not permanently fastened to output shaft 13, but rather preferably is removable, such as by being able to be longitudinally moved in a direction parallel to the axis of output shaft 13, such as by being slid along longitudinal splines of output shaft 13, for removal and replacement, or by being removable with output shaft 13, in accordance with design preference.

First and second FC gears 733 and 734 in the third embodiment can be accessed, removed and changed in a variety of ways without the need to disassemble primary gear train 2, in accordance with the specific design. First and second FC gears 733 and 734 can be located either within gearbox housing 18 or outside gearbox housing 18. If located within gearbox housing 18, first and second FC gears 733 and 734 can be made accessible for example by providing an access port 53 having a removable cover 54 proximate to the rear end 182 of gearbox housing 18 and to first and second FC gears 733 and 734, such as on the side of housing 18 (shown in FIG. 3) or on the rear end 182 itself. Access port 53 can also be positioned on the bottom of gearbox housing 18, or on the top of gearbox housing 18, or at any other location about the perimeter of gearbox housing 18 from which first and second FC gears 733 and 734 are reasonably accessible. If located outside gearbox housing 18, first and second FC gears 733 and 734 can be located within a separate housing having a removable cover attached on the rear end 182 of gearbox housing 18.

As a particular example of the benefits of the third embodiment of the subject invention, a different rotational speed/torque relationship may be desired when using inline gearbox 1 for a race track application instead of an off-road application. In such a case, first and second FC gears 733 and 734 can be swapped out for gears of different diameters, which changes the rotational speed of output shaft 13 for a given rotational speed of input shaft 6. In general, the gearbox input shaft/output shaft speed ratio can be changed by utilizing first and second FC gears 733 and 734 of varying diameters without changing any of the gears of primary gear train 2.

Embodiment 4

Figure 4A:
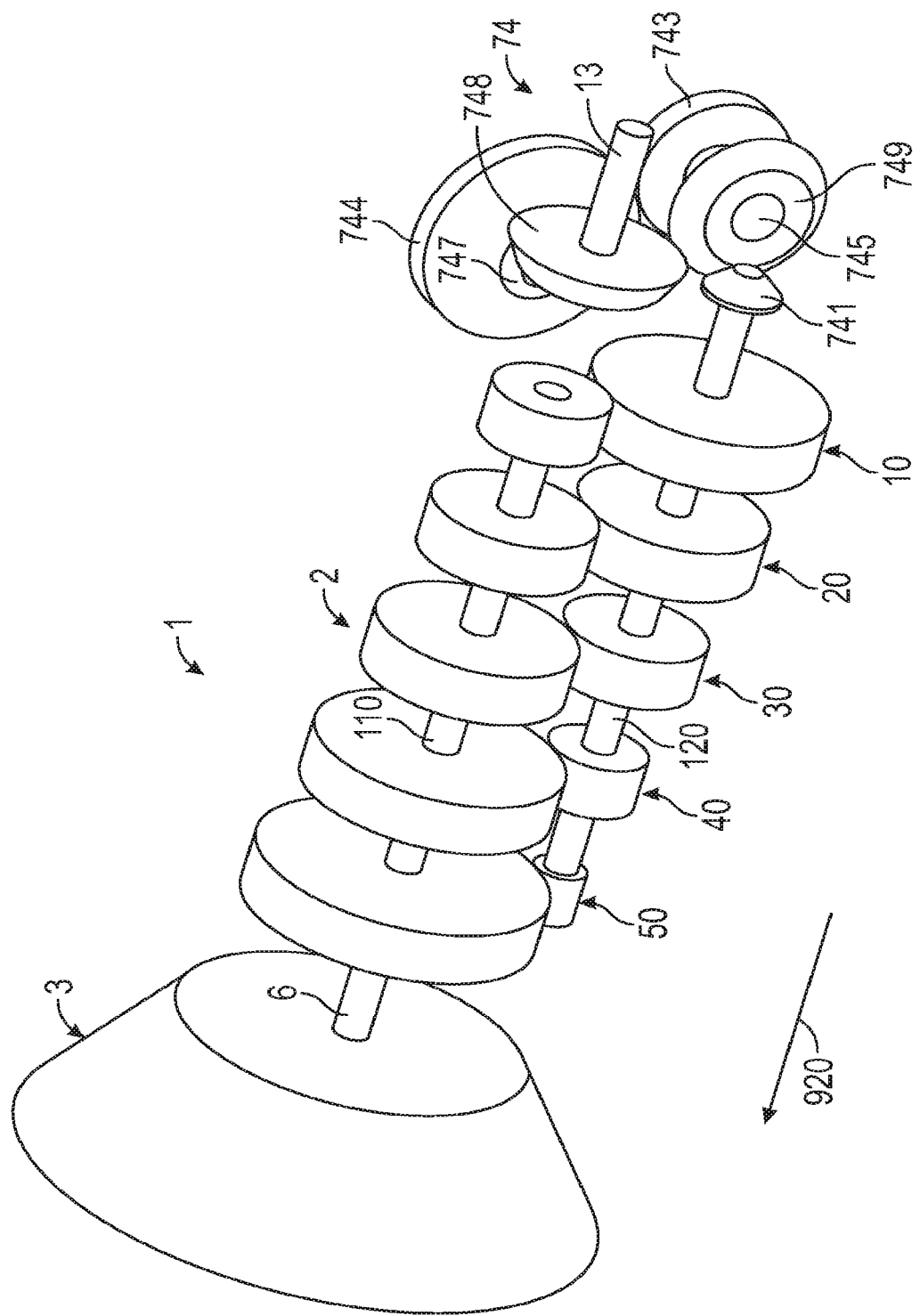
FIG. 4A is a schematic perspective view of the fourth embodiment of the present invention
Figure 4B:
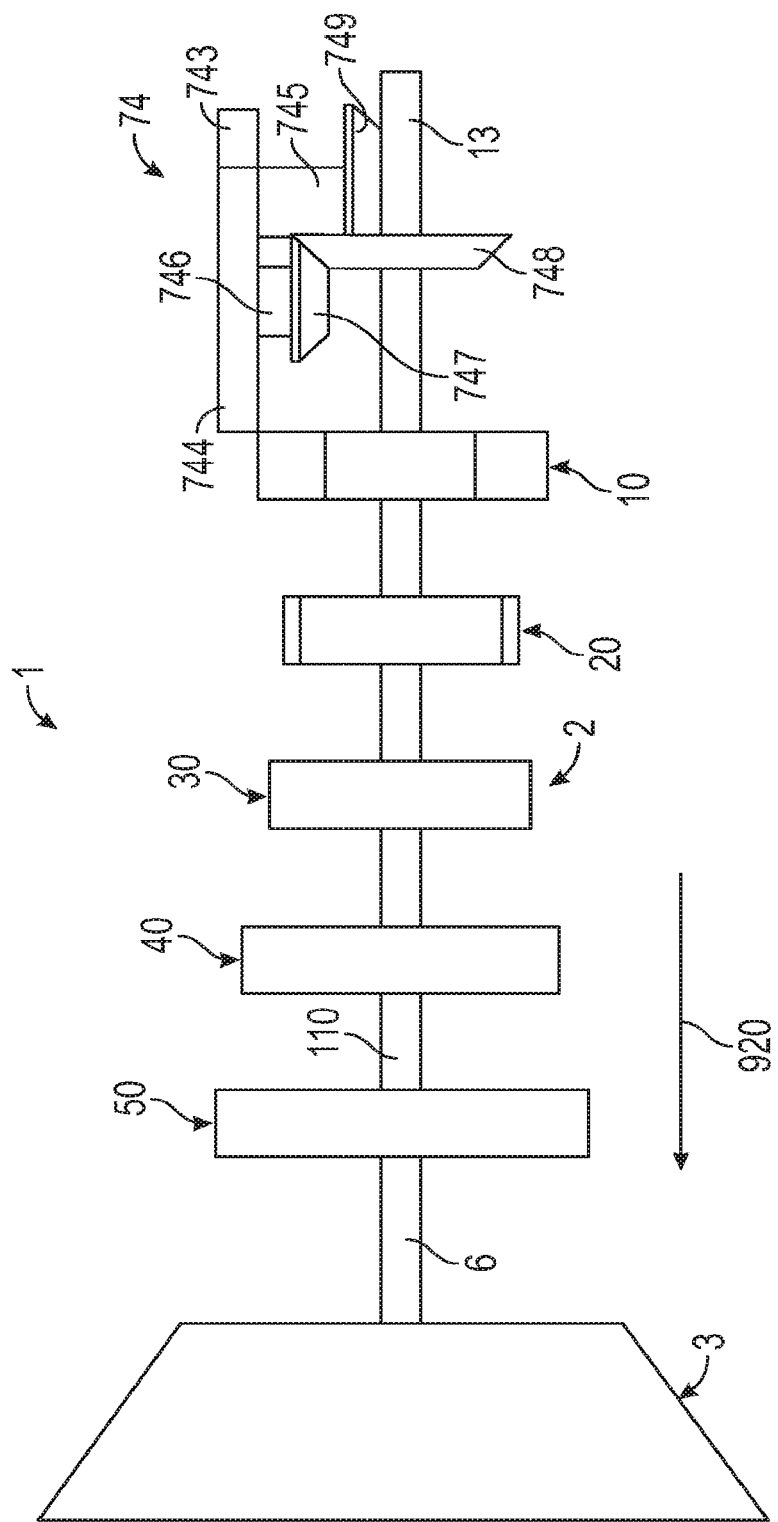
FIG. 4B is a schematic top view of the fourth embodiment of the present invention.

The fourth embodiment of the present invention, which is shown in FIGS. 4A and 4B, features a FC gear assembly 74 positioned to one side of rear vertical plane 822 of gearbox housing 18 proximate its rear end 182, interposed between lay shaft 120 and output shaft 13, and mounted on shafts different from output shaft 13 and lay shaft 120. Referring to FIGS. 4A and 4B, input shaft 6 transfers the engine torque to rotate drive shaft 110 of primary gear train 2. Drive shaft 110 in turn rotates lay shaft 120 of gear train 2 via selective engagement of one of gear pairs 10-50, as discussed above. Lay shaft 120 rotates FC gear assembly 74, which rotates output shaft 13 to rotate the wheels. In the fourth embodiment shown in FIGS. 4A-4B, output shaft 13 is not joined to drive shaft 110 (although it can be co-linear).

FC gear assembly 74 in the fourth embodiment comprises a first FC gear 743 mounted on first FC gear shaft 745, and a second FC gear 744 mounted on second FC gear shaft 746 (visible in FIG. 4B). First FC gear 743 meshes with second FC gear 744. First and second FC gears 743 and 744 can be spur or helical in design, in accordance with preference subject to other design constraints. In a first variant of the fourth embodiment of the present invention, shown in FIGS. 4A and 4B, the axes of FC gear shafts 745 and 746 each are orthogonal to longitudinally oriented rear plane 822 in any two mutually perpendicular directions on rear plane 822 (plane 822 being shown in FIG. 1A), such that the axis of first FC gear shaft 745 is perpendicular to the axis of lay shaft 120, and the axis of second FC gear shaft 746 is perpendicular to the axis of output shaft 13.

In a second variant of the fourth embodiment of the present invention, the axes of first and second FC gear shafts 745 and 746 can be transversely oriented to the direction on rear plane 822 (plane 822 being shown in FIG. 1A) that is approximately parallel to the axis of lay shaft 120 and/or the axis of output shaft 13 (which axes are parallel to each other, as described above). In this disclosure, the axes of FC gear shafts 745 and 746 are "transversely oriented" to rear plane 822 as just described when they are oriented at a FC gear shaft angle β between zero and 90 degrees (90°>β>0°) relative to the axes of output shaft 13/lay shaft 120, such as in the range of from 35 degrees to 75 degrees (75°≥β≥35°), or more particularly in the range of from 45 degrees to 60 degrees (60°≥β≥45°); for example, approximately 45 degrees (β≈45°) or approximately 60 degrees (β≈60°). Preferably, those axes of first and second FC gear shafts 745 and 746 at the same time are maintained at a right angle (or nearly so) to the direction on rear plane 822 which is perpendicular to the axes of output shaft 13/lay shaft 120.

Referring to FIGS. 4A and 4B, a bevel gear 741 mounted on the rear of lay shaft 120 meshes with a bevel gear 749 mounted on first FC gear shaft 745, and a bevel gear 748 mounted on output shaft 13 meshes with a bevel gear 747 mounted on second FC gear shaft 746. Bevel gears 741 and 749 can be spur or helical in design, in accordance with preference subject to other design constraints, and bevel gears 747 and 748 can be spur or helical in design, in accordance with preference and subject to other design constraints. Upon rotation of lay shaft 120, bevel gear 741 will rotate, which will rotate bevel gear 749 and first FC gear 743. The rotation of first FC gear 743 will rotate second FC gear 744, which will rotate bevel gear 747. In turn, the rotation of bevel gear 747 will rotate bevel gear 748 and output shaft 13. The rotational speed at which second FC gear 744 rotates will be the same as the speed at which first FC gear 743 rotates only in the case where they have the same diameter. In the case where they are of different diameters, their rotational speed will differ in direct proportion to the ratio of their diameters.

First FC gear 743 preferably is not permanently fastened within gearbox 1, but rather is secured in a manner to be removable from gearbox 1. For example, first FC gear 743 can be formed with interior splines that mate with exterior splines formed on first FC gear shaft 745; these splines preferably are longitudinally oriented parallel with the axes of gear 743 and shaft 745. Thus first FC gear 743 is able to be moved along the longitudinal splines of first FC gear shaft 745 for removal and replacement. Alternatively, first FC gear 743 and shaft 745 can be removable together as an integrated unit. As yet another alternative, first FC gear 743, first FC gear shaft 745 and bevel gear 749 can be removable together as an integrated unit.

Likewise, second FC gear 744 preferably is not permanently fastened within gearbox 1, but rather is secured in a manner to be removable from gearbox 1, for example by being secured to be moveable along the axis of second FC gear shaft 746 employing splines, or by second gear 744 and second FC gear shaft 746 being removable together as an integrated unit, or with second gear 744, second FC gear shaft 746 and bevel gear 747 being removable together as an integrated unit, in a manner comparable to that just described.

First and second FC gears 743 and 744 in the fourth embodiment can be accessed, removed and changed in a variety of ways without the need to disassemble primary gear train 2, in accordance with the specific design. First and second FC gears 743 and 744 can be located either within gearbox housing 18 or outside gearbox housing 18. If located within gearbox housing 18, first and second FC gears 743 and 744 can be made accessible for example by providing an access port having a removable cover proximate to the rear end 182 of gearbox housing 18 and to first and second FC gears 743 and 744, such as on the side of housing or on the rear end 182 itself. If located outside gearbox housing 18, first and second FC gears 743 and 744 can be located within a housing having a removable cover attached on the side of gearbox housing 18 proximate rear end 182. The FC gear housing design and associated components disclosed in U.S. patent application Ser. No. 16/168,957, filed Oct. 24, 2018 and published May 2, 2019 as U.S. Patent Publication No. US 2019/0128381 A1, is pertinent in this regard. The contents of that patent application disclosing the design specifics of that FC gear housing and cover, and the FC gear design and retention means therein, particularly the description found at ¶¶ 0041-0048 and shown in FIGS. 2A and 2B of that patent application, are incorporated by reference as if fully set forth herein.

Each of the side access port and separate housing can also be positioned on the bottom side of gearbox housing 18, or on the top side of gearbox housing 18, or at any other location about the perimeter of gearbox housing 18 from which first and second FC gears 743 and 744 are reasonably accessible, consistent with the orientation of rear plane 822.

In appropriate design circumstances, First and second FC gears 743 and 744 can also be located within a housing having a removable cover attached on rear end 182 itself, such as where FC gear shafts 745 and 746 are transversely oriented to rear plane 822 at an acute angle.

As a particular example of the benefits of the fourth embodiment of the subject invention, a different rotational speed/torque relationship may be desired when using inline gearbox 1 for a race track application instead of an off-road application. In such a case, first and second FC gears 743 and 744 can be swapped out for gears of different diameters, which changes the rotational speed of output shaft 13 for a given rotational speed of input shaft 6. In general, the gearbox input shaft/output shaft speed ratio can be changed by utilizing first and second FC gears 743 and 744 of varying diameters without changing any of the gears of primary gear train 2.

In the case where it is desirable for the input shaft 6 and output shaft 13 to rotate in different directions, an idler gear (not shown) can be interposed in any of FC gear assemblies 71, 72, 73 and 74, in which case the first and second FC gears mesh through the idler gear, rather than directly. The utilization of such an idler gear is described in connection with the FC gear housing design and associated components disclosed in U.S. patent application Ser. No. 16/168,957, filed Oct. 24, 2018 and published May 2, 2019 as U.S. Patent Publication No. US 2019/0128381 A1, which has been incorporated by reference above as if fully set forth herein.

The foregoing detailed description is for illustration only and is not to be deemed as limiting the inventions, which are defined in the appended claims.

What is claimed is:

1. An inline gearbox for a land vehicle that includes an engine having a clutch housing for the transmission of rotational force from the engine to one or more wheels for propelling the land vehicle, the inline gearbox comprising:
a gearbox housing having a front end, a side and a rear end, the front end adapted to be joined to the clutch housing;
an input shaft having an axis and contained at least in part within the gearbox housing proximate to the front end of the gearbox housing, the input shaft adapted to receive the rotational force from the engine through the clutch housing;
a primary gear train contained within the gearbox housing comprising (a) a lay shaft having an axis substantially parallel to the axis of the input shaft and rotationally coupled to the input shaft to receive rotational force from the input shaft, the axes of the input shaft and the lay shaft being spaced-apart to define a forward plane; (b) a drive shaft; and (c) a plurality of selectively engaged meshed gear pairs respectively mounted on the lay shaft and the drive shaft for transmitting rotational force from the lay shaft to the drive shaft;
an output shaft having an axis substantially parallel to the axis of the lay shaft and contained at least in part within the gearbox housing proximate to the rear end of the gearbox housing, the output shaft rotationally coupled to the drive shaft to receive rotational force from the drive shaft and for transmitting rotational force to the one or more wheels, the axes of the output shaft and the lay shaft being spaced-apart to define a rear plane;
a fast-change gear assembly positioned proximate the front end of the gearbox housing to one side of the forward plane and interposed between the input shaft and the lay shaft, the fast-change gear assembly comprising a first fast-change gear and a second fast-change gear meshing with the first fast-change gear, the first fast-change gear and the second fast-change gear having respective first and second fast-change gear axes that are both substantially perpendicularly oriented to a direction on the forward plane substantially perpendicular to the axis of the input shaft;

the first fast-change gear being rotationally coupled to the input shaft so as to rotate with the rotation of the input shaft, and the first fast-change gear being removable; and the second fast-change gear being rotationally coupled to the lay shaft so as to rotate the lay shaft upon rotation of the second fast-change gear, and the second fast-change gear being removable.

2. The inline gearbox as in claim 1, further comprising means proximate the front end of the gearbox housing for providing access to the fast-change gear assembly for removal thereof without separating the gearbox housing from the clutch housing and without disassembling the primary gear train.

3. The inline gearbox as in claim 2, wherein the first fast-change gear and the second fast-change gear of the fast-change gear assembly are contained in an ancillary housing mounted on the exterior of the gearbox housing proximate the front end of the gearbox housing, and a removable cover plate overlays the first fast-change gear and the second fast-change gear to permit their removal.

4. The inline gearbox as in claim 2, wherein the first and second fast-change gear axes are both transversely oriented to a direction on the forward plane substantially parallel to the axis of the input shaft.

5. The inline gear box as in claim 4, wherein the first and second fast-change gear axes are both transversely oriented to the direction on the forward plane substantially parallel to the axis of the input shaft at a shaft angle $\alpha$ in the range $75° \geq \alpha \geq 35°$.

6. The inline gear box as in claim 5, wherein the shaft angle $\alpha$ is in the range of $60° \geq \alpha \geq 45°$.

7. The inline gearbox as in claim 2, wherein the first and second fast-change gear axes are both perpendicularly oriented to a direction on the forward plane substantially parallel to the axis of the input shaft.

* * * * *